Dec. 27, 1966  J. D. EDICK  3,294,995

TACHOMETER GENERATOR

Filed March 11, 1963  2 Sheets-Sheet 1

INVENTOR.
JOHN D. EDICK
BY Woodling, Krost,
Granger and Rust
ATTORNEYS

Dec. 27, 1966  J. D. EDICK  3,294,995
TACHOMETER GENERATOR
Filed March 11, 1963  2 Sheets-Sheet 2

INVENTOR.
JOHN D. EDICK
BY *Woodling, Krost,*
*Granger and Rust*
ATTORNEYS

United States Patent Office 3,294,995
Patented Dec. 27, 1966

3,294,995
TACHOMETER GENERATOR
John D. Edick, Wickliffe, Ohio, assignor to Reliance Electric and Engineering Company, a corporation of Ohio
Filed Mar. 11, 1963, Ser. No. 264,429
8 Claims. (Cl. 310—95)

The invention relates in general to tachometer generators and more particularly to a temperature insensitive tachometer generator for use in the control circuit of and mounted in a dynamoelectric machine.

Many forms of dynamoelectric machines are operated under conditions where considerable heat is given off in the machine. This raises the temperature of all the parts of the machine including the bearings and shaft. Certain types of dynamoelectric machines often have a tachometer generator mounted therein or on the shaft for rotation therewith to provide a speed signal which in turn may be used in the control circuit of the dynamoelectric machine. In many such cases the tachometer generator generates some heat of its own but is also subjected to considerable heat from the dynamoelectric machine. Where the speed signal from the tachometer generator is used in the control circuit to attempt to control the speed of the dynamoelectric machine, and if the speed signal should vary not only with speed but with temperature, then this would give a false signal to the control circuit and would result in undesired changes in speed instead of holding the speed constant at a pre-set value.

Prior art forms of tachometer generators have met this problem by utilizing some form of compensation such as a shunt in the generator magnetic circuit of a material especially sensitive in its change of magnetic permeability with temperature such that flux in the alternator pole and core structure remained essentially constant while flux in the body of the permanent magnet changed with temperature. With this compensation scheme it was extremely difficult to achieve linear compensation over a wide range of temperature.

Accordingly, an object of the invention is to provide a temperature insensitive tachometer generator over a wide range.

Another object of the present invention is to provide a tachometer generator which is substantially temperature insensitive by use of a compensated magnet structure and magnetic circuit.

Another object of the present invention is to provide a tachometer generator in an eddy current coupling subjected to wide temperature ranges wherein the tachometer generator is mounted in the coupling and connected in the control circuit for the coupling and wherein the tachometer generator is substantially temperature insensitive in output voltage.

Another object of the present invention is to provide a tachometer generator utilizing Alnico VI in a low permeance magnetic circuit for temperature stability of the output voltage.

Other objects and a fuller understanding of this invention may be had by referring to the following description and claims, taken in conjunction with the accompanying drawings, in which:

Figure 1:
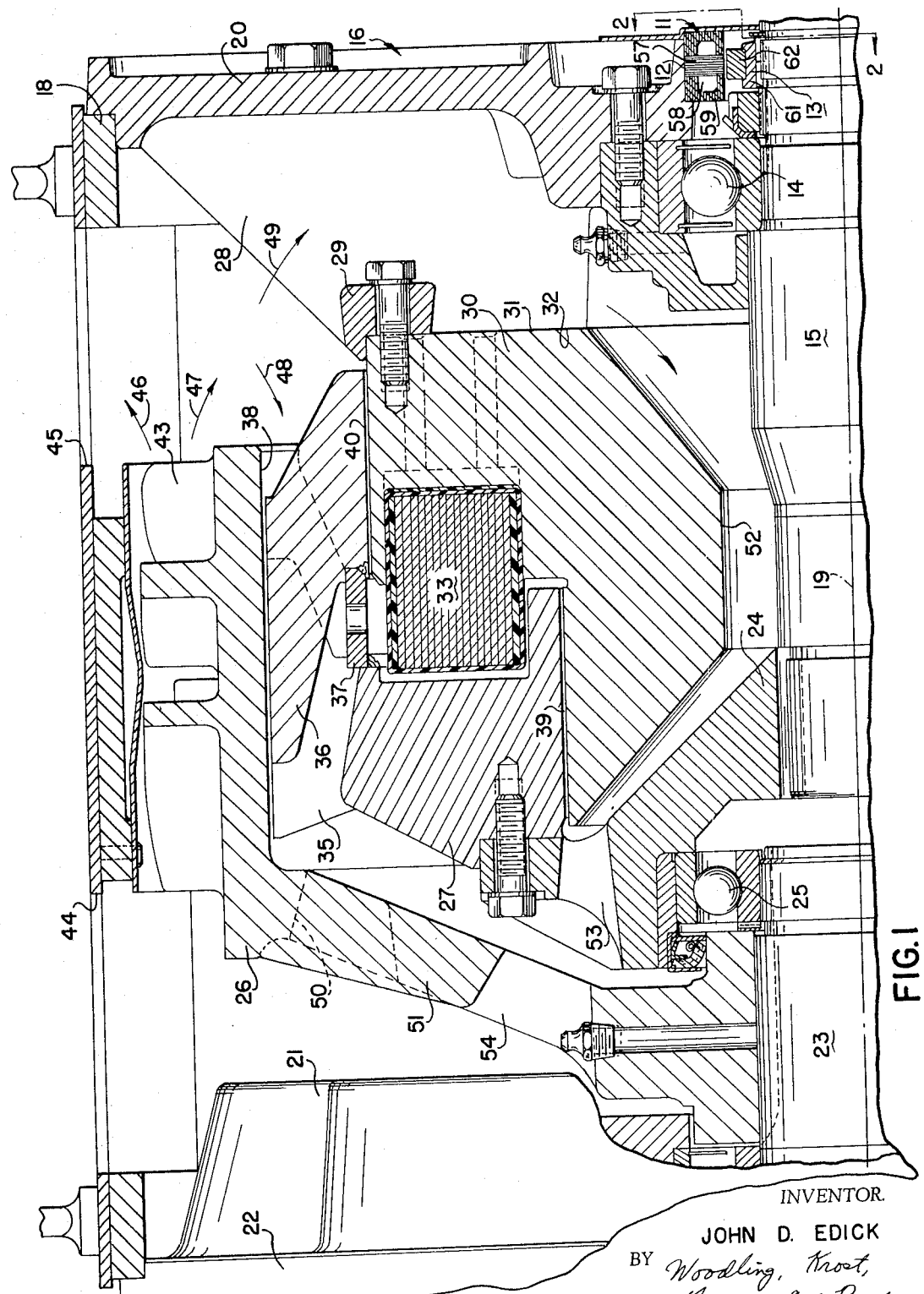
FIGURE 1 is a longitudinal sectional view of a dynamoelectric machine embodying the tachometer generator of the invention.
Figure 2:
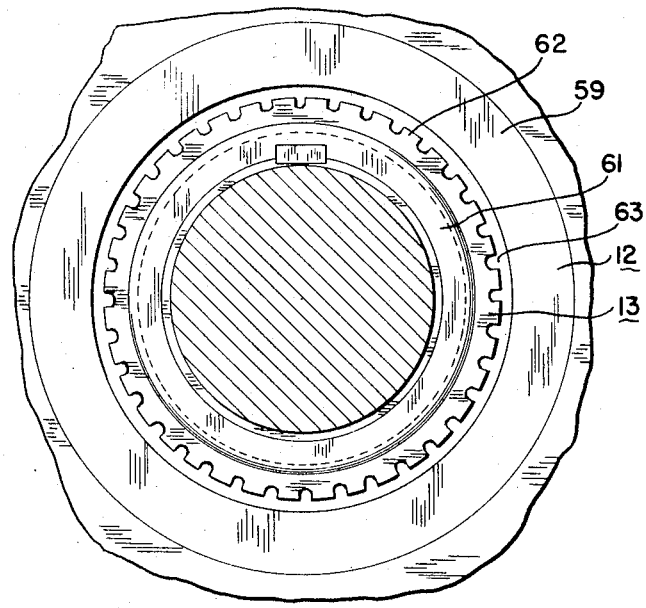
FIGURE 2 is an enlarged sectional view on line 2—2 of FIGURE 1 with the generator cover removed.

FIGURE 1 shows a tachometer generator 11 which illustrates one embodiment of the invention. This tachometer generator 11 has a stator 12 and a rotor 13. The rotor 13 is journalled relative to the stator 12 by a bearing 14. This bearing is also a bearing for an output shaft 15 of a dynamoelectric machine 16. This dynamoelectric machine 16 is illustrated as being an eddy current coupling having a frame or housing 18. This housing has an axis 19 with end bells 20 and 21. The end bell 21 may also serve as the end bell of a motor 22 driving an input shaft 23 for the eddy current coupling 16. The end bell 20 journals the output shaft 15 by means of the bearing 14, and the output shaft 15 fixedly carries a non-magnetic bearing hub 24 which is journalled by means of a pilot bearing 25 to the input shaft 23 to maintain coaxial alignment of the input and output shafts. An eddy current drum 26 is driven by the input shaft 23 within the housing 18. A magnetic permeable rotor 27 is carried on the bearing hub 24 for rotation relative to the eddy current drum 26.

The end bell 20 has radial fins 28 which are axially parallel and which are integral with the end bell 20. This end bell may be of aluminum, for example, as one type of non-magnetic material. An annular mounting ring 29 is integral with and joins all the radial fins 28. A core body 30 has a mounting surface 31 mounted on a surface 32 of the radial fins 28 and the annular mounting ring 29. This core body carries a coil 33 which is fixed in this core body 30. The coil 33 may be constructed of insulated strip conductor with the strips generally parallel to the axis 19 so that heat is conducted primarily longitudinally through the coil 33 and core body 30 and into the radial fins 28.

A first set of teeth 35 are carried on the magnetic permeable rotor 27 and a second set of teeth 36 are carried on a non-magnetic ring 37 in turn carried on the permeable rotor 27. The first and second sets of teeth 35 and 36 are interdigitated for cooperation with the inner surface 38 of the eddy current drum 26. The magnetic circuit around the coil 33 is through the core body 30 across a first parasitic gap 39, through the permeable rotor 27, the first set of teeth 35, into the eddy current drum 26, returning into the other set of teeth 36 and across another parasitic gap 40 to the core body 30.

An axial flow fan 43 is one form of air blower to provide cooling air for the eddy current coupling. This axial flow fan 43 may be integral with the outer surface of the eddy current drum 26 to be driven at a substantially constant speed from the motor 22. The axial flow fan 43 may be bi-directional, depending upon the direction of rotation of the motor 22 and in one direction of rotation, the inlet air for the fan 43 may come from air inlet openings 44 and be primarily exhausted through air outlet openings 45. Of course, for reversed direction of rotation, the function of these openings 44 and 45 would be reversed. The main air flow of these air openings is thus indicated by a main air path 46. A secondary air path 47 may be provided for recirculating air divided between recirculating air paths 48 and 49. The first recirculating air path 48 may pass between the teeth 36 and 35 and the inner surface 38 of the eddy current drum 26 and pass through apertures 50 in the eddy current drum support 51. The second recirculating path 49 may pass radially between the radial fins 28 across the surface of the housing of the bearing 14 and axially between the shaft 15 and the inner surface 52 of the core body 30 and then between the bearing hub 24 and the core body 30 and through apertures 53 in this bearing hub 24 and through apertures 54 in the drum support 51 to return to the intake of the axial flow fan 43. The air flow in the main air path 46 withdraws heat from the eddy current drum 26. The air flow in the first recirculating air path 48 withdraws heat from the inner surface of this drum 26 plus heat in the sets of teeth 35 and 36. The air flow in the second recirculating air path 48 withdraws heat from the coil 33 via the core body 30 and withdraws heat from the bearing 14 and pilot bearing 25.

This eddy current coupling 16 is typical of the types of dynamoelectric machines wherein considerable heat is generated therein. The heat in this machine may reach as high as 60 to 80 degrees C. with much of this heat transmitted into the radial fins 28 and the end ball 29, especially where the material thereof is aluminum. Accordingly, much of this heat is conducted directly to the tachometer generator 11.

The stator 12 of this tachometer generator 11 may have a laminated annular core 57 having slots for a plurality of stator windings 58. Preferably an encapsulation is provided for the stator core and windings and this may be a material such as an epoxy resin 59.

Figure 3:
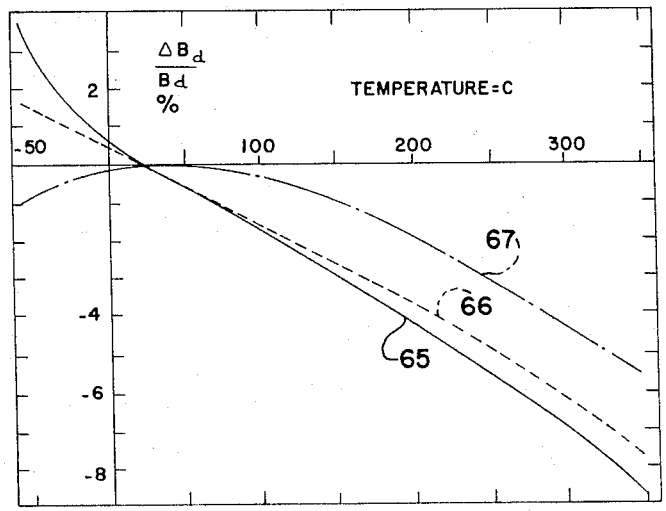
FIGURE 3 is a graph of operating conditions of the magnet in the tachometer generator; and, FIGURE 4 is a schematic diagram of a dynamoelectric machine control circuit.

The tachometer generator rotor 13 utilizes the bearing 14 of the dynamoelectric machine 16. The rotor 13 includes a non-magnetic rotor hub 61 and, for example, this may be constructed of aluminum. This non-magnetic hub is fixed on the output shaft 15 for rotation therewith and is closely adjacent the bearing 14. A ring permanent magnet 62 is fixed on the hub 61 for a permanent magnet rotor of this generator 11. The permanent magnet 62 has a multiplicity of poles, for example 36 poles which are salient poles for cooperation with the stator output winding 58. The permanent magnet 62 is positioned radially adjacent the laminated stator core 57 so that an alternating current voltage is generated in the winding 58 upon rotation of this permanent magnet 62. In a tachometer generator actually constructed in accordance with this invention, the rotor was about three inches in diameter and an air gap 63 of about .030 inch was provided between the rotor and the stator. This is an air gap of about .010 inch per inch of diameter of the rotor. This is a relatively large air gap for permanent magnet motors or generators and establishes a magnetic circuit including the rotor and stator with a relatively low permeance coefficient of about 6.5 to 7.0. The permeance coefficient of the magnetic circuit is defined as the ratio of the external magnetic circuit permeance to the permeance of the space occupied by the magnet. Still further, the permanent magnet 62 is constructed of Alnico VI which has a constitution of about 8% aluminum, 15% nickel, 24% cobalt, 3% copper, 1% titanium and the balance being iron. This particular constitution of Alnico VI has been found to have the unique property of substantially uniform flux density over a fairly wide temperature range when used in a low permeance magnetic circuit in the order of 6.5 to 7.0. FIGURE 3 better illustrates this property and shows the percent change of flux density in the body of the magnet 62 as an ordinate plotted against temperature in degrees centigrade on the abscissa. A curve 65 shows the change in flux density for change in temperature for a typical high permeance magnetic circuit of 56.0 as typically used in permanent magnet motors or generators. Another curve 66 shows the change of flux density plotted against temperature for a lower permeance coefficient of 15.0. Curve 67 shows a plot of change of flux density with change of temperature for a permeance coefficient of 6.6 for this Alnico VI material. This shows that this material in a magnetic circuit of this low a permeance coefficient has a substantially constant flux density over the range of about 20 degrees C. to 80 degrees C. This means that the heating in the eddy current coupling 16 which will establish concurrent heating of the magnet 62 will have substantially no effect on the field strength of the permanent magnet 62 within the range of about 20 degrees to 80 degrees C. and, accordingly, there will be substantially no effect on the output voltage of this tachometer generator 11.

Figure 4:
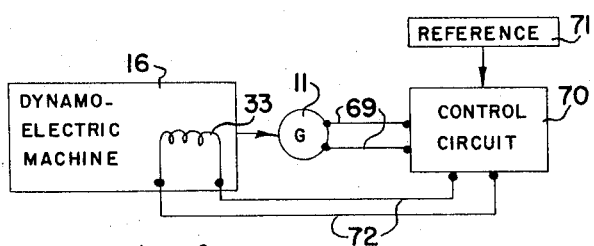

FIGURE 4 illustrates in block form how the dynamoelectric machine 16 has the coupling coil 33 and also drives the tachometer generator 11. This generator 11 has an output voltage which is a speed signal voltage on conductors 69 which speed signal voltage is supplied to a control circuit 70. A reference source 71 may supply some form of reference voltage to the control circuit 70. This control circuit may compare the speed signal voltage and the reference voltage to produce an error signal which is used in the control circuit 70 to supply energy on conductors 72 to the coupling coil 33. This determines the speed of the eddy current coupling 16. Accordingly, it will be seen that if the generator output voltage were to change with temperature, then the speed of the eddy current coupling 16 would also change erroneously because the control circuit would try to maintain a preset value of the error signal. It has been found that the use of this Alnico VI material in the tachometer generator magnet 62 in the low permeance circuit of a value of about 7.0 gives constant speed of the eddy current coupling 16. Once a speed is set in the control circuit 70, this control circuit works to maintain that speed within specified limits throughout a wide range of torque loadings of the eddy current coupling 16 and consequent temperature range of this eddy current coupling 16 and tachometer generator 11. It has been found that the long term thermal drift of output voltage of this tachometer generator is exceedingly small and the speed will be maintained constant within plus or minus one r.p.m. for many hours of operation at different ambient temperatures within this range of 20 degrees C. to 80 degrees C.

It will be noted that the tachometer generator 11 is in a location within the eddy current coupling 16 which is subjected to wide temperature variation due to heating of the output bearing 14, the coil 33 and inductor drum 26. Without some form of temperature compensation, the tachometer generator output voltage at a given speed would change with temperature because of reversible changes in the field strength of the permanent magnet 62. The effect of permanent magnet thermal response would be a change in output shaft speed. The tachometer generator 11 with its built-in temperature compensation provides this constancy of output speed of the eddy current coupling regardless of temperature change within this temperature range.

The large air gap in the tachometer generator in the order of .030 inch has two advantages of providing the low permeance magnetic circuit and also establishing relative insensitivity to air gap eccentricity of rotor and stator. Also, the large air gap plus the fact that the tachometer generator 11 is mounted closely adjacent the bearing 14 has two advantages. Any deflection in the shaft 15 due to transverse loading thereon or other causes has negligible effect on the air gap and, hence, negligible effect on the tachometer generator output voltage. Accordingly, it will be observed that a tachometer generator has been provided for a dynamoelectric machine which is relatively insensitive to temperature changes within the usual ranges of operation of such dynamoelectric machines.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tachometer generator comprising, in combination, a stator,
    a bearing in said stator,
    a rotor journalled in said bearing,
    a permanent magnet carried on one of said rotor and stator and having pairs of poles thereon,
    a generator output winding carried on the other of said rotor and stator and cooperating with said magnet, said tachometer generator having a magnetic circuit including said rotor and stator with a permeance coefficient in the range below 10.0, and said permanent magnet being made of material of about 8% aluminum, 15% nickel, 24% cobalt, 3% copper, 1% titanium and the balance being iron, whereby heating of said magnet within a given range above average room temperature of about 20 degrees C. has substantially no effect on the field strength of said permanent magnet of said tachometer generator and, accordingly, substantially no effect on the output voltage thereof.

2. A tachometer generator for use in a dynamoelectric machine control circuit as a speed signal source and mounted in the dynamoelectric machine, said dynamoelectric machine having a bearing journaling a shaft therein, said tachometer generator comprising, in combination, a stator, means to fix said stator in said dynamoelectric machine, a rotor fixed relative to said shaft adjacent said bearing, a permanent magnet on one of said rotor and stator and having pairs of poles thereon, a generator output winding on the other of said rotor and stator and cooperating with said magnet, said rotor being positioned on said output shaft closely adjacent said bearing and with a relatively large air gap with said stator in the order of .010 inch per inch of diameter of rotor, whereby deflections of said shaft have negligible effect on the air gap between said rotor and stator, said tachometer generator having a magnetic circuit including said rotor and stator with a permeance coefficient in the range below 10.0, and said permanent magnet being made of material of about 8% aluminum, 15% nickel, 24% cobalt, 3% copper, 1% titanium and the balance being iron, whereby heating of said magnet within the range of about 20 degrees to 80 degrees C. has substantially no effect on the field strength of said permanent magnet of said tachometer generator and, accordingly, substantially no effect on the output voltage thereof.

3. A tachometer generator for use in an environment with a temperature range from 20 degrees C. to 80 degrees C., said tachometer generator comprising, in combination, a stator, a bearing in said stator, a rotor journalled by said bearing and adjacent thereto, a permanent magnet having a plurality of poles on one of said rotor and stator, a generator output winding on the other of said rotor and stator and cooperating with said permanent magnet, said rotor being positioned closely adjacent said bearing and with a relatively large air gap with said stator in the order of .010 inch per inch of diameter of rotor, whereby eccentricities of said rotor have negligible effect on the air gap between said rotor and stator, said tachometer generator having a magnetic circuit including said rotor and stator with a permeance coefficient in the range below 10.0, and said permanent magnet being made of material of about 8% aluminum, 15% nickel, 24% cobalt, 3% copper, 1% titanium and the balance being iron, whereby heating of said magnet within the range of about 20 degrees to 80 degrees C. has substantially no effect on the field strength of said permanent magnet of said tachometer generator and, accordingly, substantially no effect on the output voltage thereof.

4. A tachometer generator for use in a dynamoelectric machine control circuit as a speed feedback signal source and mounted in the dynamoelectric machine, said dynamoelectric machine having a bearing journaling a shaft therein, said tachometer generator comprising, in combination, a stator, a permanent magnet rotor having poles thereon and fixed relative to said shaft adjacent said bearing, a stator output winding on said stator, said rotor being positioned on said output shaft closely adjacent said bearing and with a relatively large air gap with said stator in the order of .010 inch per inch of diameter of rotor, whereby deflections of said shaft have negligible effect on the air gap between said rotor and stator, said tachometer generator having a magnetic circuit including said rotor and stator with a permeance coefficient in the range below 10.0, and said permanent magnet being made of material of about 8% aluminum, 15% nickel, 24% cobalt, 3% copper, 1% titanium and the balance being iron, whereby heating of said magnet within the range of about 20 degrees to 80 degrees C. has substantially no effect on the field strength of said permanent magnet rotor of said tachometer generator and, accordingly, substantially no effect on the output voltage thereof.

5. An alternating current tachometer generator for use in an environment with a temperature range from 20 degrees C. to 80 degrees C., said tachometer generator comprising, in combination, a stator, a bearing in said stator, a permanent magnet rotor having a multiplicity of pairs of poles thereon and journalled by said bearing and adjacent thereto, a stator output winding on said stator, said rotor being positioned closely adjacent said bearing and with a relatively large air gap with said stator in the order of .010 inch per inch of diameter of rotor, whereby eccentricities of said rotor have negligible effect on the air gap between said rotor and stator, said tachometer generator having a magnetic circuit including said rotor and stator with a permeance coefficient of about 7.0, and said permanent magnet rotor being made of Alnico VI whereby heating of said magnet within the range of 20 degrees to 80 degrees C. has substantially no effect on the field strength of said permanent magnet rotor of said alternating current tachometer generator and, accordingly, substantially no effect on the output voltage thereof.

6. An alternating current tachometer generator for use in an eddy current coupling control circuit as a speed feedback signal source and mounted in the eddy current coupling, said eddy current coupling having a bearing journaling an output shaft therein, said tachometer generator comprising, in combination, a stator, a permanent magnet rotor having a multiplicity of pairs of poles thereon and fixed relative to said shaft adjacent said bearing, a laminated annular core in said stator, a stator output winding on said laminated core, said rotor being positioned on said output shaft closely adjacent said bearing and with a relatively large air gap with said stator in the order of .010 inch per inch of diameter of rotor, whereby deflections of said shaft have negligible effect on the air gap between said rotor and stator, said tachometer generator having a magnetic circuit including said rotor and stator with a permeance coefficient of about 7.0, and said permanent magnet rotor being made of Alnico VI whereby heating of said eddy current coupling and consequently heating of said magnet within the range of 20 degrees to 80 degrees C. has substantially no effect on the field strength of said permanent magnet rotor of said alternating current tachometer generator and, accordingly, substantially no effect on the output voltage thereof.

7. An alternating current tachometer generator for use in a heated environment in a range from 20 degrees C. to 80 degrees C., said tachometer generator comprising, in combination, a stator, an aluminum hub journalled adjacent said bearing for rotation, a permanent magnet rotor having a multiplicity of pairs of poles thereon and fixed on said aluminum hub, a laminated annular core in said stator, surfaces defining slots in said laminated core, a plurality of stator windings on said laminated core and in said slots, epoxy resin encapsulation on said core and stator windings, said rotor being positioned closely adjacent said bearing and with a relatively large air gap with said stator in the order of .010 inch per inch of diameter of rotor, whereby eccentricities of said rotor have negligible effect on the air gap between said rotor and stator, said tachometer generator having a magnetic circuit including said rotor and stator with a permeance coefficient of about 7.0, and said permanent magnet rotor being made of Alnico VI whereby heating of said magnet within the range of 20 degrees to 80 degrees C. has substantially no effect on the field strength of said permanent magnet rotor of said alternating current tachometer generator and, accordingly, substantially no effect on the output voltage thereof.

8. An alternating current tachometer generator for use in an eddy current coupling control circuit as a speed feedback signal source and mounted in the eddy current coupling, said eddy current coupling having a bearing journaling an output shaft therein, said tachometer generator comprising, in combination, an aluminum hub mounted adjacent said bearing for rotation with said output shaft, a permanent magnet rotor having a multiplicity of pairs of poles thereon and fixed on said aluminum hub, a stator fixedly mounted in said eddy current coupling and cooperating with said rotor, said stator comprising a laminated annular core, surfaces defining slots in said laminated core, a plurality of stator windings on said laminated core and in said slots, epoxy resin encapsulation on said core and stator windings, said rotor being positioned on said output shaft closely adjacent said bearing and with a relatively large air gap with said stator in the order of .010 inch per inch of diameter of rotor, whereby deflections and eccentricities of said shaft have negligible effect on the air gap between said rotor and stator, said tachometer generator having a magnetic circuit including said rotor and stator with a permeance coefficient of about 7.0, and said permanent magnet rotor being made of Alnico VI whereby heating of said eddy current coupling and consequent heating of said magnet within the range of 20 degrees to 80 degrees C. has substantially no effect on the field strength of said permanent magnet rotor of said alternating current tachometer generator and, accordingly, substantially no effect on the output voltage thereof.

References Cited by the Examiner
UNITED STATES PATENTS

| | | | |
|---|---|---|---|
| 2,803,765 | 8/1957 | Timmerman | 310—156 |
| 2,817,029 | 12/1957 | Jaeschke | 310—96 |
| 2,927,229 | 3/1960 | Merrill | 310—156 X |

OTHER REFERENCES

Hadfield: Book—Permanent Magnets, published by John Wiley and Sons, New York City, pp. 447 to 453.

MILTON O. HIRSHFIELD, *Primary Examiner.*

DAVID X. SLINEY, *Examiner.*